Aug. 13, 1929.　　　M. J. SCHULLER　　　1,724,733

AIR CLEANER FOR ROCK DRILLS

Filed Dec. 21, 1925

INVENTOR
MARTIN J. SCHULLER
BY Ralph W. Brown
ATTORNEY

Patented Aug. 13, 1929.

1,724,733

UNITED STATES PATENT OFFICE.

MARTIN J. SCHULLER, OF MILWAUKEE, WISCONSIN.

AIR CLEANER FOR ROCK DRILLS.

Application filed December 21, 1925. Serial No. 76,686.

This invention relates to pneumatically operated rock drills and more particularly to air cleaners therefor.

Rock drills are ordinarily provided with suitable sieves or strainers which serve to filter out the dust and dirt from the air stream before admitting the air to the operating parts of the drill. Such sieves are ordinarily placed within the drill casing where they are inaccessible for inspection and repair. Frequent clogging of the sieve to such an extent as to render the tool inoperative or, at least, ineffective is a common experience, and is a constant source of annoyance, loss of time, and expense. This clogging is the most common cause of failure in rock drills, but because of the position of the sieve within the casing, the actual cause of the failure cannot be ascertained without opening up the casing of the drill.

Furthermore, it is common practice in mining operations to disconnect the drill from the air hose in order to transport the drill from one point to another in the mine, the drill remaining free from the hose until its use is required. While so disconnected the interior of the drill is wide open, through the passage in the bushing that receives the hose, so that dirt and dust is free to enter the same. That is one cause of frequent clogging.

One object of the present invention is to eliminate the above difficulties by a novel arrangement and mounting of the sieve. This I accomplish by fixing the sieve within the bushing that ordinarily receives the hose, so that, when the hose is removed, the sieve will prevent the admission of dirt to the interior of the casing, and where it will be readily accessible for inspection and repair.

Another object is to so mount the sieve within the bushing as to prevent accidental removal thereof when the hose is disconnected.

Other objects and advantages will appear from the following description of an illustrative embodiment of the present invention.

In the drawings:—

Figure 1:
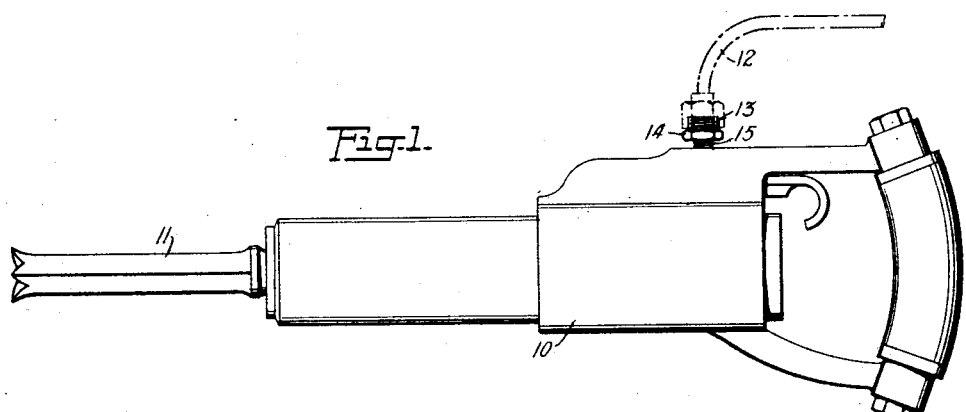
Figure 1 is a side elevation of a well known form of rock drill, which is provided with a sieve mounted in accordance with the present invention.
Figure 2:
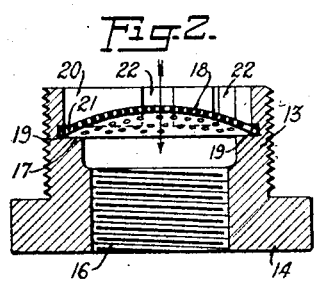
Fig. 2 is a sectional view of a bushing with a sieve attached.
Figure 5:
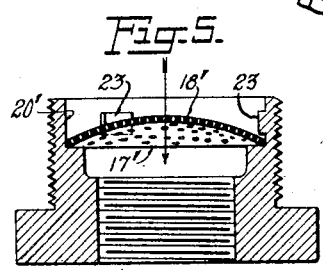
Figure 3:
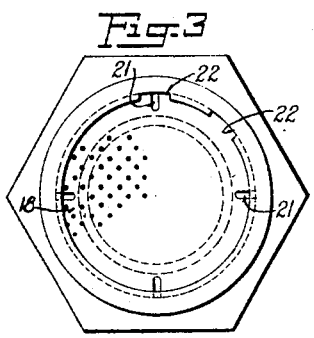
Fig. 3 is an end view of the bushing.
Figure 6:
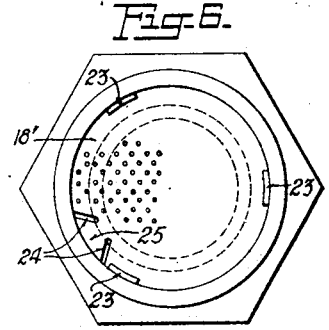
Figure 4:
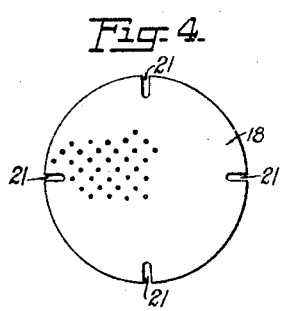
Fig. 4 is a face view of the sieve.
Figure 7:
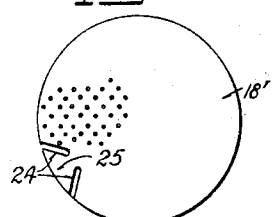

Figs. 5, 6, and 7 are views similar to Figures 2, 3, and 4, respectively, illustrating a sieve and bushing of modified form.

The rock drill shown comprises the usual casing 10, containing the usual mechanism for operating the tool or bit 11. Air under pressure is delivered to the drill through a hose 12 removably connected in the usual manner to the reduced threaded end 13 of the bushing 14, permanently connected to the casing through a short pipe 15, threaded into the opening 16 of the bushing.

The bushing shown in Figures 2, 3, and 4 is hollow and internally fashioned to provide an annular shoulder 17 forming a seat for a circular sieve 18. Adjacent the shoulder 17 the interior wall of the bushing is undercut to form a peripherial groove 19 for embracing the edge of the sieve. The sieve is preferably of perforated brass or other bendable sheet metal and of arched form, the original diameter being such as to permit its free passage through the enlarged bore 20 of the bushing. The sieve is applied by passing it through the bore 20, onto the seat 17, with the convex surface facing outwardly. Then by tapping the center of the convex face, or otherwise applying pressure thereto, the sieve is caused to expand, forcing the periphery thereof into locking engagement within the groove 19. This expansion is of course rendered possible by the arched formation of the sieve. To facilitate this expansion the edge of the sieve may be slitted at one or more points, as indicated at 21.

It will be noted that with the sieve in this position, the air from the hose, which flows in the direction of the arrow, tends to maintain the sieve on its seat and to maintain it in expanded condition. The material of the sieve is such however as to ordinarily retain this expanded condition, and the fact that the periphery of the sieve is engaged within the groove 19 prevents accidental displacement thereof when the hose is removed. It will also be noted that the sieve is in such position as to be readily accessible for inspection and cleaning, and that it effectively prevents the admission of dirt to the casing while the hose is removed.

In order to permit ready removal of the sieve for replacement, longitudinal grooves 22 are formed in the surface of the bore 20 through which a pointed tool may be inserted and engaged beneath the edge of the sieve, to pry it loose.

Various other methods of permanently mounting the sieve may be employed, such for instance as that shown in Figures 5, 6 and 7. The bushing shown in these figures is similar to that above described except that lugs 23 are provided within the enlarged bore 20'. These lugs are spaced from the seat 17' a distance slightly greater than the thickness of the edge of the sieve 18'. The sieve 18' is also of arched form. It however is provided with slits 24, so as to permit the intermediate portion 25 of the edge thereof to be bent up to clear one of the lugs 23 when inserted through the bore. To apply this sieve one edge thereof is inserted beneath two of the lugs 23 with the portion 25 bent up to clear the other of the lugs. The sieve is then applied to the seat 17' and then rotated slightly until the bent up portion 25 is offset from the adjacent lug, after which the bent up portion 25 is flattened down into its original position. The sieve is thus securely locked against accidental removal.

Various changes may be made in either of the embodiments of the invention hereinabove described without departing from or sacrificing any of the advantages of the invention as defined in the appended claims.

I claim:

1. An air cleaner for pneumatic drills and the like comprising a one piece bushing having a passage therethrough, means on said bushing adjacent one end of said passage for external attachment to a drill casing, means on said bushing adjacent the other end thereof for attachment to a hose, a sieve insertable and removable through the last mentioned end of said passage, an inwardly projecting shoulder within said passage forming a seat for said sieve, and integral means for releasably retaining said sieve against said seat independently of said attaching means.

2. An air cleaner for pneumatic drills and the like comprising a one piece bushing having a passage therethrough, internally threaded means adjacent one end of said passage for external application to a drill casing, externally threaded means adjacent the other end of said passage for application to a hose, a sieve insertable and removable through the last named end of said passage, a shoulder within said passage forming a seat for said sieve, and integral means projecting inwardly of said passage for retaining said sieve against said seat.

In witness whereof, I hereunto subscribe my name this 17th day of December, 1925.

MARTIN J. SCHULLER.